Patented Aug. 14, 1928.

1,680,845

UNITED STATES PATENT OFFICE.

LOUIS BENDA, OF MAINKUR, NEAR FRANKFORT-ON-THE-MAIN, GERMANY, ASSIGNOR TO I. G. FARBENINDUSTRIE AKTIENGESELLSCHAFT, A CORPORATION OF GERMANY.

SUBSTITUTED 4.4' DIHYDROXYBISACYLAMINO-ARSENOBENZENES.

No Drawing. Application filed May 23, 1927, Serial No. 193,744, and in Germany June 28, 1926.

My present invention relates to new substituted 4.4'-dihydroxybisacylamino-arsenobenzenes having probably the general formula:

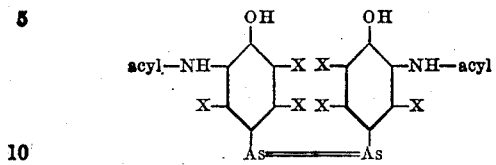

wherein the X's mean hydrogen atoms, of which at least one is replaced by a monovalent substituent, which may be obtained by reducing the corresponding arsonic acid compounds by means of reducing agents usual for this process.

The new arseno compounds are distinguished by an excellent resistance to the air (therefore they may be prepared, isolated purified etc. in open vessels with access of air without any change of the products or increase of their toxity, they may be dispensed per os without any precaution in powder form, in tablets or in aqueous suspension) and by a very good curative power for instance toward syphilis. They are very well endured, also when dispensed per os, and in contrast to other arsenical compounds commended for the peroral treatment of syphilis they do not produce injurious by-effects on the nervous system (trembling, excitement, movements, dancing mouses). The new compounds are appropriated also for a peroral treatment of certain tropical diseases.

4.4' - dihydroxybisacylamino - arsenobenzenes, which contain a chlorine atom in each benzene nucleus, are especially valuable.

In order to further illustrate my invention the following examples are given, the parts being by weight and all temperatures in centigrade degrees, but it is understood, that my invention is not limited to the particular products or reacting conditions mentioned therein.

Example I.

50 parts of the 3-chloro-4-hydroxy-5-acetaminobenzene-1-arsonic acid, described in U. S. Patent 1,588,382, are intimately mixed with 550 parts of methylic alcohol and while well cooling about 150 parts of hydrochloric acid ($d=1,185$) are added carefully, the temperature not rising above 15°. The somewhat turbid liquor is filtered and while adding 2 parts of hydroiodic acid ($d=1,7$) it is mixed at about 16–17° with a solution prepared as follows:

100 parts of sodium hypophosphite are dissolved in 50 parts of boiling water and after cooling down the solution there are added 500 parts of methylic alcohol and about 230 parts of hydrochloric acid ($d=1,185$). Then at about 15° the liquor is filtered from the separated common salt.

The mixture of the aforesaid components warms by itself to about 24° and the new arseno compound separates slowly as a yellow powder. After about half an hour the precipitate is filtered through an open filter and washed with methylic alcohol and ether. The new compound having probably the formula:

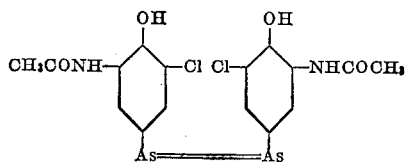

is when dry a yellowish powder, insoluble in water, easily soluble in dilute caustic alkali solutions, difficultly soluble in alcohol. It is precipitated unchanged by acidifying the alkaline solutions. It is not diazotizable.

Example II.

When subjecting the isomeric 2-chloro-4-hydroxy - 5 - acetaminobenzene - 1 - arsonic acid to the process as described in Example I the corresponding 2.2'-dichlor-4.4'-dihydroxy - 5.5' - diacetamino - arsenobenzene of the probable formula:

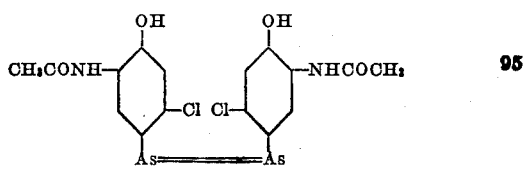

is obtained, which is similar in its properties to the compound, described in Example I, but more soluble in alcohol.

The above mentioned proportions of the quantities of the components used may be varied within large limits and the sodium hypophosphite may be replaced by other suitable reducing agents. Instead of the acetyl compound other acyl derivatives of the respective arsonic acids may be used, also other homologues and substitution products, corresponding to the aforesaid general formula.

I claim:

1. As new products substituted 4.4'-dihydroxy-bisacylamino-arsenobenzenes having probably the general formula:

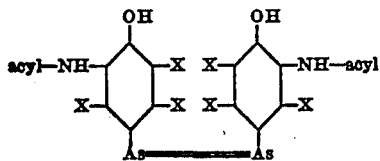

wherein the X's mean hydrogen atoms, of which at least one is replaced by a monovalent substituent, which products are when dry yellowish powders, insoluble in water, easily soluble in dilute caustic alkali solutions and precipitated by acidifying these solutions, being not diazotizable, distinguished by an excellent resistance to the air and by a very good curative power.

2. As new products chlorinated 4.4-dihydroxybisacylamino-arsenobenzenes having probably the general formula:

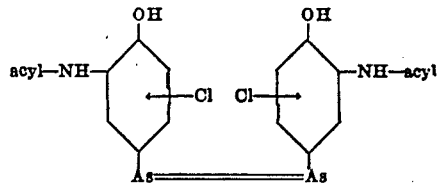

which are when dry yellowish powders, insoluble in water, easily soluble in dilute caustic alkali solutions and precipitated by acidifying these solutions, being not diazotizable, distinguished by an excellent resistance to the air and by a very good curative power.

3. As a new product the compound of the probable formula:

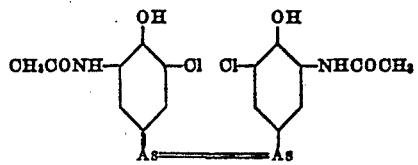

being when dry yellowish powder, insoluble in water, easily soluble in dilute caustic alkali solutions, difficultly soluble in alcohol and not being diazotizable.

In testimony whereof, I affix my signature.

LOUIS BENDA.